US009355425B2

(12) United States Patent
Gargi et al.

(10) Patent No.: US 9,355,425 B2
(45) Date of Patent: May 31, 2016

(54) SOFT POSTING TO SOCIAL ACTIVITY STREAMS

(71) Applicants: Ullas Gargi, Sunnyvale, CA (US); Richard C. Gossweiler, III, Sunnyvale, CA (US)

(72) Inventors: Ullas Gargi, Sunnyvale, CA (US); Richard C. Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 752 days.

(21) Appl. No.: 13/660,065

(22) Filed: Oct. 25, 2012

(65) Prior Publication Data

US 2014/0122584 A1 May 1, 2014

(51) Int. Cl.
*G06F 15/16* (2006.01)
*G06Q 50/00* (2012.01)
*G06F 17/30* (2006.01)

(52) U.S. Cl.
CPC ...................................... *G06Q 50/01* (2013.01)

(58) Field of Classification Search
CPC .............. G06Q 50/01; G06Q 30/0254; G06Q 30/0201; G06Q 30/0202; G06Q 30/0631; H04L 67/22; H04L 67/306; H04L 29/06; H04L 65/403; H04L 51/32; H04M 15/58
USPC ......................... 709/204, 205, 217, 229, 246; 705/14.66, 7.32, 14.49, 14.52, 14.53, 705/14.58, 319; 715/753
See application file for complete search history.

(56) References Cited

U.S. PATENT DOCUMENTS

| | | | | |
|---|---|---|---|---|
| 8,311,950 | B1 * | 11/2012 | Kunal et al. | 705/319 |
| 8,606,792 | B1 * | 12/2013 | Jackson et al. | 707/748 |
| 8,621,012 | B2 * | 12/2013 | Jackson et al. | 709/206 |
| 8,676,887 | B2 * | 3/2014 | Kim et al. | 709/204 |
| 8,700,540 | B1 * | 4/2014 | Zambrano et al. | 705/319 |
| 2008/0147743 | A1 * | 6/2008 | Taylor et al. | 707/104.1 |
| 2010/0153213 | A1 * | 6/2010 | Pomplun et al. | 705/14.53 |
| 2010/0262658 | A1 * | 10/2010 | Mesnage | 709/204 |
| 2011/0153423 | A1 * | 6/2011 | Elvekrog et al. | 705/14.53 |
| 2012/0030711 | A1 * | 2/2012 | Rae et al. | 725/46 |

(Continued)

FOREIGN PATENT DOCUMENTS

| | | |
|---|---|---|
| KR | 10-2009-0081579 | 7/2009 |
| KR | 10-2011-0093438 | 8/2011 |

OTHER PUBLICATIONS

Jon Duck-Schlossberg et al., "Battlefield Awareness and Data Dissemination Intelligent Information Dissemination Server," Final Technical Report, Air Forces Search Laboratory, Lockheed-Martin Corporation, Nov. 1999, 31 pages.

(Continued)

*Primary Examiner* — Alina N Boutah
(74) *Attorney, Agent, or Firm* — Fish & Richardson P.C.

(57) ABSTRACT

Methods, systems, and apparatus, including computer programs encoded on a computer storage medium, for receiving a soft post authored by a user, the soft post including a content item and having a distribution associated therewith, the distribution including a selected group of users that are socially connected to the user, determining an interest level with respect to a content item of the soft post based on content items submitted by one or more users of the selected group of users, the interest level reflecting a likelihood that users of the selected group of users would be interested in the viewing the soft post, comparing the interest level to an interest level threshold associated with the soft post, and selectively providing user access to the content item of the soft post based on the comparing.

30 Claims, 5 Drawing Sheets

(56) References Cited

U.S. PATENT DOCUMENTS

| | | | | |
|---|---|---|---|---|
| 2012/0054275 | A1* | 3/2012 | Channell | 709/204 |
| 2012/0078684 | A1 | 3/2012 | Maciocci et al. | |
| 2012/0166432 | A1* | 6/2012 | Tseng | 707/728 |
| 2012/0166433 | A1 | 6/2012 | Tseng | |
| 2012/0272160 | A1* | 10/2012 | Spivack et al. | 715/752 |
| 2013/0013383 | A1* | 1/2013 | Vitti et al. | 705/14.16 |
| 2013/0054695 | A1* | 2/2013 | Holman et al. | 709/204 |
| 2013/0091223 | A1* | 4/2013 | DeLuca et al. | 709/206 |
| 2013/0124322 | A1* | 5/2013 | Boland et al. | 705/14.58 |
| 2013/0159110 | A1* | 6/2013 | Rajaram et al. | 705/14.66 |
| 2013/0339091 | A1* | 12/2013 | Humay | 705/7.32 |
| 2014/0019453 | A1* | 1/2014 | Mohan et al. | 707/738 |
| 2014/0025734 | A1* | 1/2014 | Griffin | 709/204 |
| 2014/0025735 | A1* | 1/2014 | Garcia-Martinez et al. | 709/204 |
| 2014/0052534 | A1* | 2/2014 | Gandhi | 705/14.58 |
| 2014/0089780 | A1* | 3/2014 | Garcia-Martinez et al. | 715/234 |
| 2014/0095606 | A1* | 4/2014 | Matus | 709/204 |
| 2014/0229487 | A1* | 8/2014 | Mukund et al. | 707/740 |
| 2015/0248647 | A1* | 9/2015 | Goel et al. | 705/321 |

OTHER PUBLICATIONS

Nathan Eagle et al., "Social Serendipity: Proximity Sensing and Cueing," MIT Media Laboratory Technical Note 580, May 2004, 18 pages.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Alice Emily Marwick, "Selling Your Self: Online Identity in the Age of a Commodified Internet," Thesis for degree of Master of Arts, University of Washington, 2005, 192 pages.

Tony Hammond et al., "Social Bookmarking Tools (I)," D-Lib Magazine, vol. 11, No. 4, Apr. 2005, 23 pages.

International Search Report and Written Opinion in International Application No. PCT/US2013/066621, mailed Feb. 17, 2014, 11 pages.

International Preliminary Report on Patentability in International Application No. PCT/US2013/066621, mailed May 7, 2015, 8 pages.

* cited by examiner

SOFT POSTING TO SOCIAL ACTIVITY STREAMS

BACKGROUND

This specification generally relates to soft posting in social networking environments.

Internet-based social networks provide a digital medium for users to interact with one another and to share information. For example, users are able to distribute electronic content (e.g., textual comments, digital images, digital videos, digital audio, hyperlinks to Web sites, etc.) to other users that they might be connected with in the social network. Electronic content that is distributed to a user can be displayed to the user automatically in a content stream in a main (or "stream") page, and/or in response to a user query in a search results page.

SUMMARY

Innovative aspects of the subject matter described in this specification can be embodied in methods that include actions of receiving a soft post authored by a user, the soft post including a content item and having a distribution associated therewith, the distribution including a selected group of users that are socially connected to the user, determining an interest level with respect to a content item of the soft post based on content items submitted by one or more users of the selected group of users, the interest level reflecting a likelihood that users of the selected group of users would be interested in the viewing the soft post, comparing the interest level to an interest level threshold associated with the soft post, and selectively providing user access to the content item of the soft post based on the comparing. Other implementations of these aspects include corresponding systems, apparatus, and computer programs, configured to perform the actions of the methods, encoded on computer storage devices.

These and other implementations may each optionally include one or more of the following features. For instance, determining an interest level includes identifying content items submitted by users of the selected group of users that are related to the content item of the soft post; identifying content items that are related to the content item of the soft post includes identifying content items that reference a common entity with the content item of the soft post; identifying content items that are related to the content item of the soft post includes identifying content items that include a common tag identifier with the content item of the soft post; identifying content items that are related to the content item of the soft post includes determining textual similarity between the content items and the content item of the soft post; determining an interest level includes calculating a score based on content items submitted by users of the selected group of users that are related to the content item of the soft post; calculating the score includes determining a quantity of users that have submitted related content items; the content items submitted by the users include content items submitted by the users prior to receiving the soft post; selectively providing access includes distributing the content item of the soft post to each user in the selected group of users in response to determining that the interest level is greater than or equal to the interest level threshold; and actions further include transmitting, to the author of the soft post, a notification that the content item of the soft post has been distributed.

Particular implementations of the subject matter described in this specification may be implemented so as to realize one or more of the following advantages. Users are able to post seemingly trivial content items with confidence that they will not spam their social network contacts, for example, by specifying that these updates are not shared globally until there is sufficient interest in the content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to soft posting in social networking environments. In some examples, soft posts include posts that are not accessible to other users until it has been determined that there is sufficient interest in the content of the soft post (as opposed to a hard posts, which can be immediately accessible to other users). In particular, implementations of the present disclosure can include receiving a soft post at a server system implementing a social networking service, determining an interest level corresponding to a content item of the soft post, and comparing the interest level to a threshold value. In some examples, the interest level can reflect a likelihood that users, to which the soft post could be distributed, would be interested in viewing the soft post. Access to the soft post content item can be controlled based on the comparison. The soft post can include multiple data components including, for example, an electronic content item (e.g., a textual comment, digital image, digital video, or digital audio file) generated by an author, distribution data defining a recipient of the content item, and an interest level threshold associated with the content item. As discussed in detail below, the interest level threshold is a parameter value reflecting a minimum acceptable interest level associated with the content item of the soft post for the content item to "go live," so as to be distributed to users defined in a distribution associated with the soft post. In some examples, the interest level corresponding to the content item of the soft post can be determined based on content items that have been distributed or shared by other users of the social networking service who are socially connected to the author of the soft post (e.g., members of the author's social graph).

Figure 1:
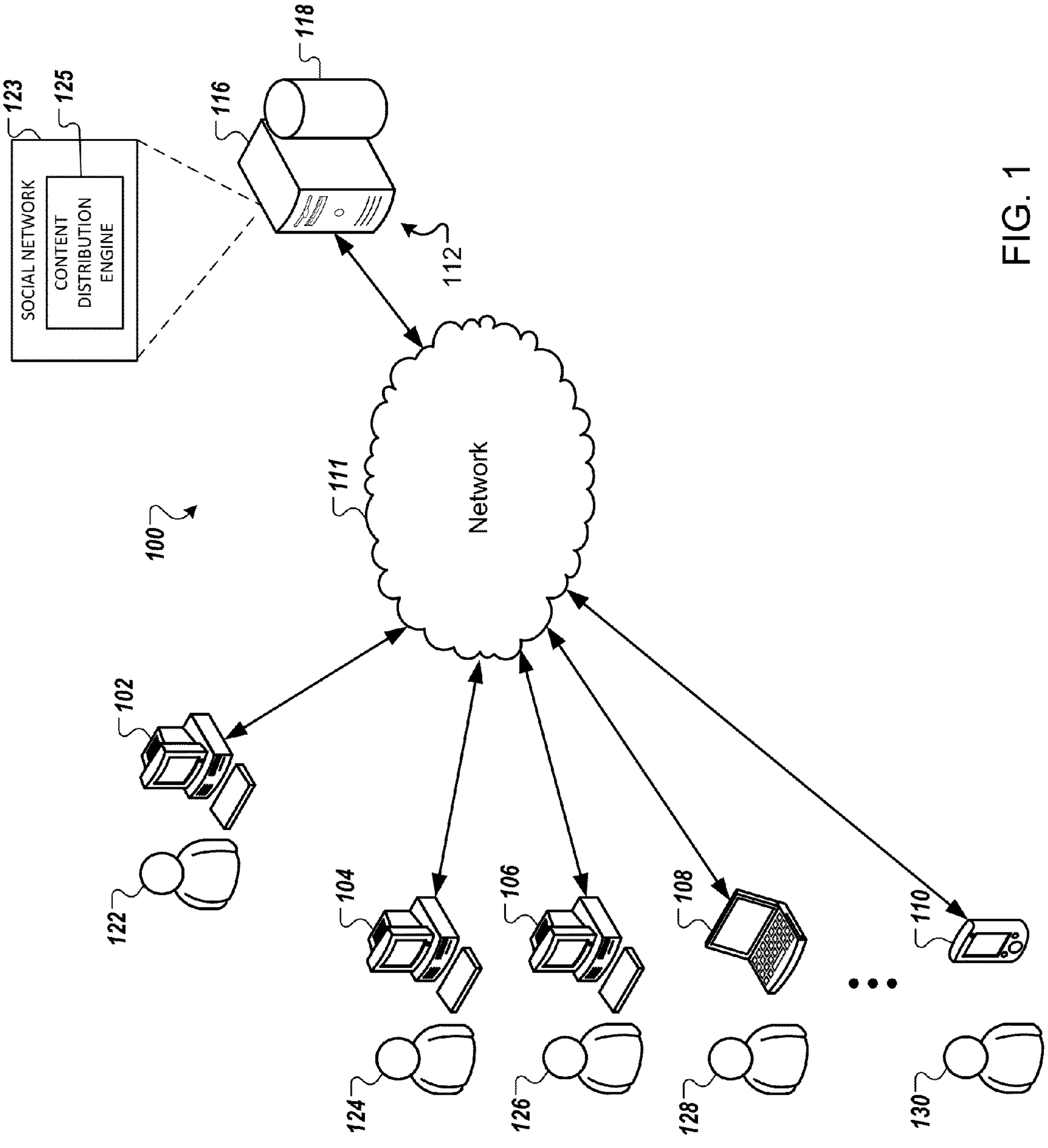
FIG. 1 is a block diagram showing an example network environment on which the processes described herein, or portions thereof, can be implemented.

FIG. 1 is a block diagram showing an example network environment 100 on which the processes described herein, or portions thereof, can be implemented. The network environment 100 includes computing devices 102, 104, 106, 108, 110 that are configured to communicate with a server system 112 over a network 111. The computing devices 102, 104, 106, 108, 110 have respective users 122, 124, 126, 128, 130 associated therewith. The server system 112 includes a computing device 116 and a machine-readable repository, or database 118. The example environment 100 can include many thousands of Web sites, computing devices and servers, which are not shown.

The network 111 can include a large computer network, examples of which include a local area network (LAN), wide area network (WAN), the Internet, a cellular network, or a combination thereof connecting a number of mobile computing devices, fixed computing devices, and server systems. The network(s) included in the network 111 can provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, e.g., using a BLUETOOTH, WiFi, or other such transceiver system.

The computing devices 102, 104, 106, 108, 110 enable the respective users 122, 124, 126, 128, 130 to access and to view documents, e.g., Web pages included in Web sites. For example, the user 122 of the computing device 102 can view a Web page using a Web browser. The Web page can be provided to the computing device 102 by the server system 112 or another server system (not shown).

In the example environment 100, the computing devices 102, 104, 106 are illustrated as desktop-type computing devices, the computing device 108 is illustrated as a laptop-type computing device, and the computing device 110 is illustrated as a mobile computing device. It is noted, however, that the computing devices 102, 104, 106, 108, 110 can include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some examples, a computing device is included as part of a motor vehicle (e.g., an automobile, an emergency vehicle (e.g., fire truck, ambulance), or a bus).

The users interacting with the computing devices 102, 104, 106, 108, 110 can participate in a social network 123 hosted, e.g., by the server system 112, by uploading and downloading electronic content items to the social network. As noted above, the electronic content can include, e.g., text comments (e.g., updates, announcements, and replies), digital images, videos, audio files, and/or other appropriate information. In some examples, information is posted on a user's behalf by systems and/or services external to the social network 123 or the server system 112. For example, the user can post a review of a movie to a movie review Web site, and with proper permissions, that Web site can cross-post that review to the social network 123 on the user's behalf. In another example, a software application executing on a mobile device, with proper permissions, can use global positioning system (GPS) capabilities to determine the user's location and automatically update the social network 123 with the user's location (e.g., "At Home", "At Work", "In Boston, Mass."). Generally, users interacting with the computing devices 102, 104, 106, 108, 110 can also use the social network 123 to organize and categorize the user's relationships to other users participating in the social network.

Electronic content items provided by an author can be distributed to selected contacts within the social network 123, so that such content is viewable by the selected contacts (In some examples, content items can also be generally distributed using the social networking service such that other users, who are not contacts of the author, can access the content). In an example operation, a user of the social network 123 can generate content and indicate, e.g., one or more individual social network contacts to which the generated content is to be distributed. During a content write-time, a content dataset is transmitted from the user's client computing device (e.g., the computing device 102 of FIG. 1) to a distribution hub (e.g., a content distribution engine 125), which can be provided at a server (e.g., the server system 112 of FIG. 1 or elsewhere on the network). In some examples, the content dataset includes content data (e.g., text, identify of the content author, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some examples, other data is appended to content data sets. Example other data can include soft posting data. In some examples, soft posting data can include an interest level threshold. As described in more detail below, the interest level threshold is a quantifiable parameter reflecting a minimum acceptable level of interest associated with the content item of the soft post.

In some examples, the distribution data is processed to provide an access control list (ACL) that specifies which contacts within the social network are granted access to the content. For example, distribution data can indicate that content is to be accessible by, and/or distributed to, a particular user. In some examples, the ACL can be amended or updated to control access of the associated content item based on the soft posting techniques described herein.

Generally, the distribution hub determines end points to which the content data set is to be distributed based, e.g., on the ACL. For example, the set of contacts that can interact with the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., the database 118 of FIG. 1) and are transmitted to a client device associated with the requesting user. In some examples, content is distributed to a user's main page for inclusion in a content stream. Distributed content can also be provided in response to a user query on a search results page.

Figure 2:
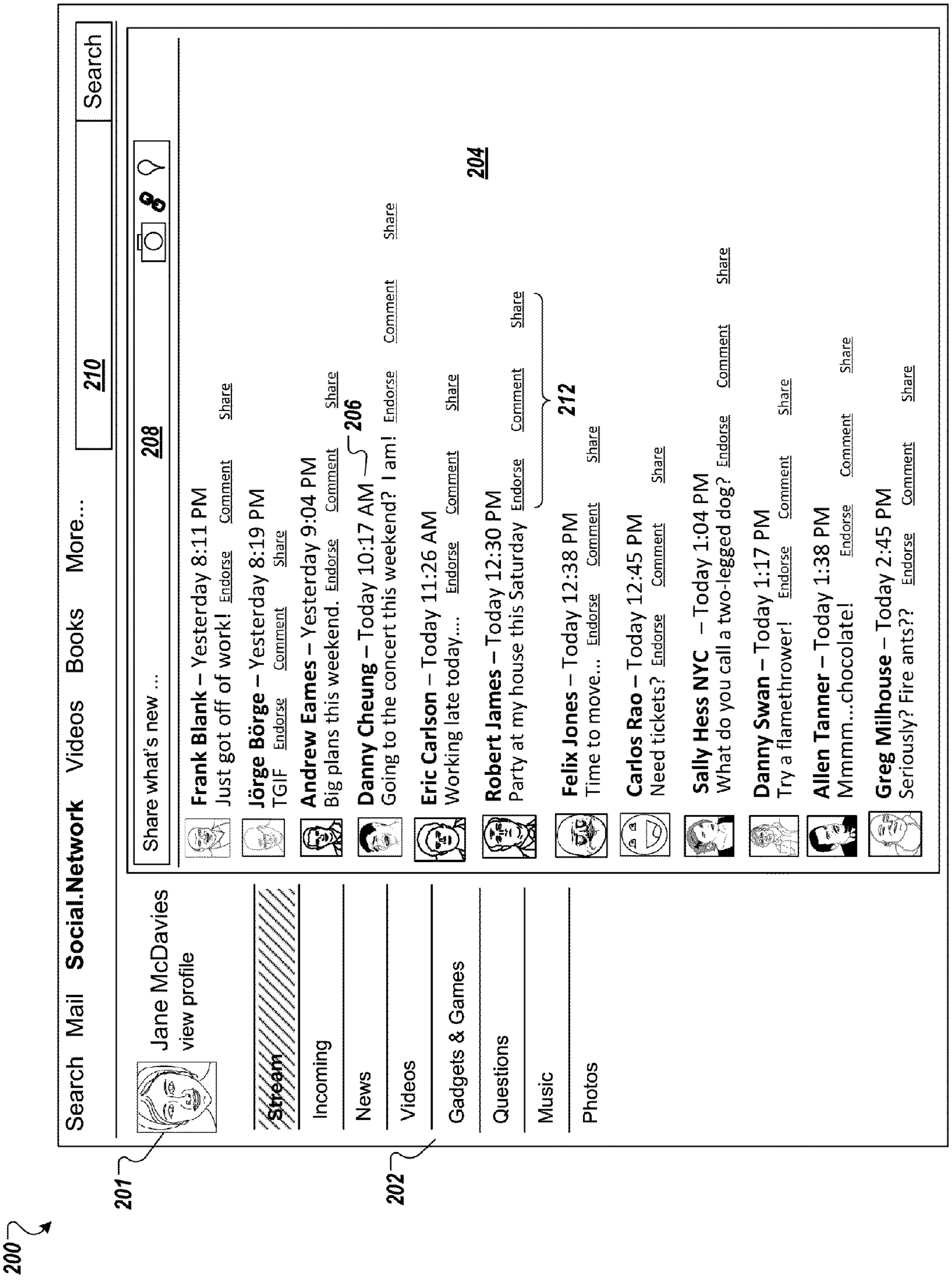
FIG. 2 shows an example main page associated with a user account on a social network.

FIG. 2 shows an example main page 200 associated with a user account on a social network. For example, the page 200 can be provided as a Web page within a Web site of the social network 123, and can display electronic content that has been distributed or shared with a user 201 associated with the page 200. In the illustrated example, the example user is "Jane McDavies" and the page 200 displays, items (e.g., electronic content) that other users have shared with the Jane. As shown, the page 200 includes a social network menu 202 and a content stream 204, in which items of content are presented. Example content items 206 that have been distributed to the user are displayed in the content stream 204. Generally, the items 206 displayed in the content stream 204 include electronic content that is distributed to the user from contacts or other participating users within the social network. A content sharing interface 208 can also be provided on the page 200. The user can activate (e.g., click on) the content sharing interface 208 to share electronic content. Although twelve content items are depicted in FIG. 2, it is appreciated that the page 200 can display more or less than twelve content items to the user. A search field 210 can also be provided on the page 200 to search social network 123 for content.

Users can interact with distributed content by designating the content as endorsed, sharing and/or commenting on the content, quoting URLs, or otherwise indicating an interest or liking of content. For example, an application, widget, or scripting can be provided in search results pages, Web pages, or within a browser application that allows a user to indicate liking, sharing, or other evaluation of a particular distributed content item, resource or search result. For instance, in this example, each of the content items 206 is displayed in the content stream 204 with associated interaction elements 212. The elements 212 can be activated by the user (e.g., by clicking on them) to interact with the distributed content items 206.

Users socially connected to the author of a soft post can be identified using a social graph. A social graph is a way to graphically represent social connections between two parties that may, or may not, be on the same social network, and to represent connections between parties and content. A party can be an individual or an entity, e.g., a company, organization, country, or the like. Types of connections in social graphs can include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection can be unilateral or bilateral. In some implementations, a social graph includes content generated by individuals (e.g., blog posts, reviews) as connections to the user. The social graph can include connections within a single network or across multiple networks.

Distinct social graphs can be generated for different types of connections. For example, a user may be connected with chat contacts in one social graph, electronic message contacts in a second social graph, and connections from a particular social network in a third social graph. A social graph can include edges to additional parties at greater degrees of separation from the user. For example, an electronic message contact can have its own electronic message contacts to others adding a degree of separation from the user. These contacts may, in turn, have additional contacts at another degree of separation from the user. Similarly, a party's connection to someone in a particular social network can be used to identify additional connections based on that person's connections. Distinct social graphs can include edges connecting one or more social graphs to one or more other social graphs. Thus, a social graph can include a single social graph or multiple interconnected social graphs.

Affinity between entities of a social graph may be represented by the above-noted edges in the user's social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Implementations of the present disclosure are directed to processes, systems, and computer readable medium for facilitating soft posting by users participating in social networks. For example, some implementations include receiving a soft post authored by a user participating in the social network. The soft post can include, for example, a content item, distribution data, and an interest level threshold. As noted above, the content item can be provided in the form of a textual comment, digital image, digital video, or digital audio file. The distribution data can include raw distribution data indicating the intended recipients of the content item, or processed distribution data in the form of an ACL.

The interest level threshold is a parameter value (e.g., a percentage or a raw score) reflecting a minimum acceptable level of interest associated with the content item of the soft post. In some examples, the interest level threshold for the soft post can be defined by default settings automatically established for a particular user profile, and/or manually defined by an author of the soft post. Some implementations also include determining a level of interest related the content item of the soft post. The level of interest or "interest level" is a measurable quantity (e.g., a score or other type of social signal) which reflects how a selected group of other social network users (e.g., members of the author's social graph and/or recipients of the content item identified in the distribution data) will perceive the content item. Put simply, the interest level provides a general expectation as to whether the selected group of users will view the content item as trivial (e.g., spam) or significant. The interest level is compared to the interest level threshold, and access to the content items by the recipients is controlled based on this comparison. For example, in a particular implementation, if the interest level is greater than, or equal to, the interest level threshold, each of the recipients is granted access to the content item of the soft post. Other appropriate control schemes can also be implemented.

Figure 3:
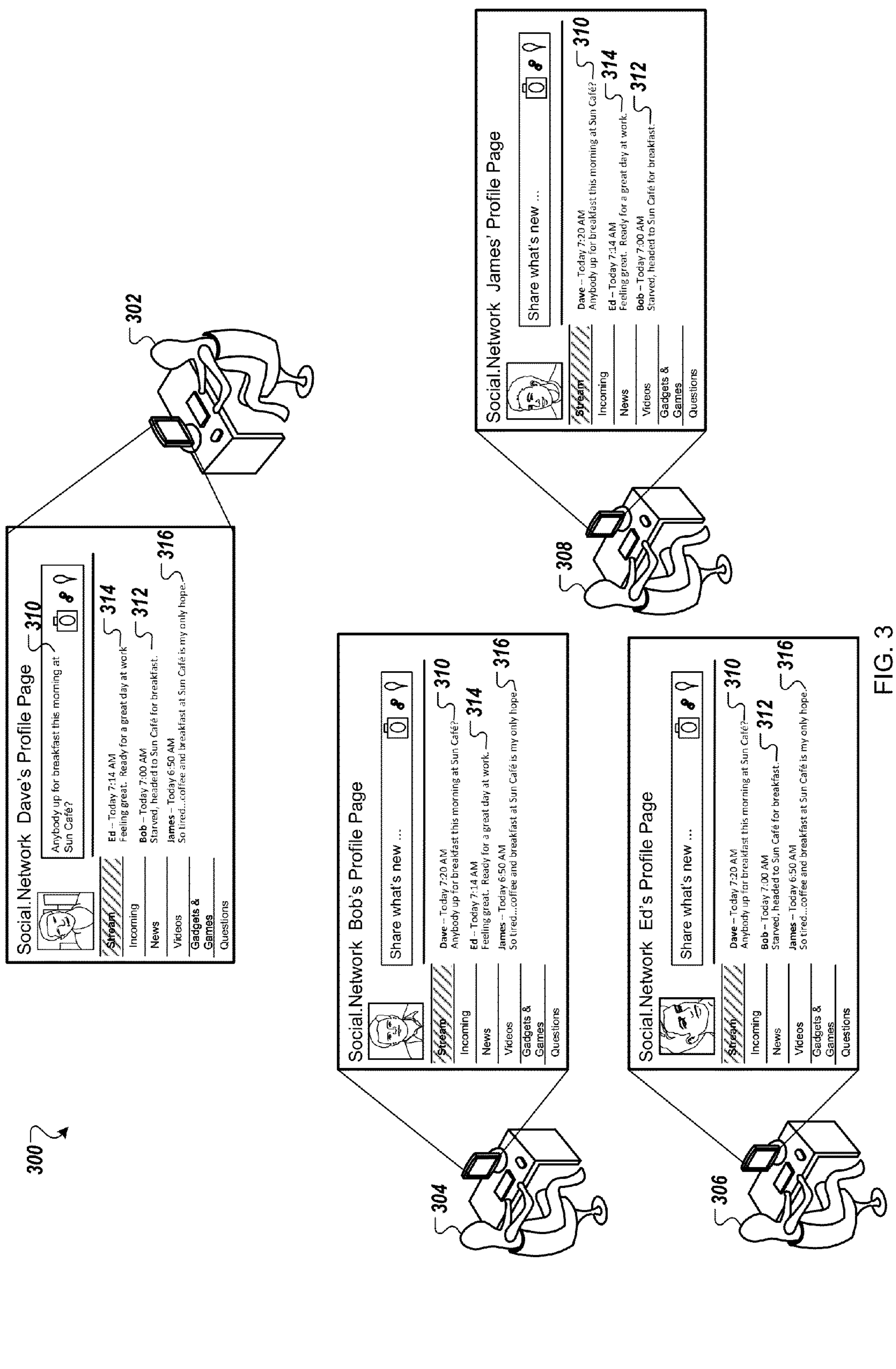
FIG. 3 is a diagram illustrating social networking interactions by a group of users.

FIG. 3 is a diagram 300 illustrating social networking interactions by a group of users. In this example, user 302 "Dave" is socially connected with users 304-308, "Bob", "Ed", and "James". Dave has authored the content item 310, a textual comment stating, "Anybody up for breakfast this morning at Sun Café?" The content item 310 is part of a soft post that also includes distribution data identifying Bob, Ed, James, and several other users as recipients of the content item. The soft post further includes an interest level threshold which provides a minimum level of interest which must be achieved before the content item is made available (e.g., visible or otherwise accessible) to its intended recipients.

In some examples, an interest level associated with the soft post content item 310 can be determined based on content authored by a selected group of users who are socially connected to Dave. The selected group of users can include the recipients identified in the distribution data of the soft post, and/or other users selected from Dave's social graph. In some examples, the selected group of users includes members of the social network who are not socially connected with Dave. In this particular example, the selected group of users consists of Bob, Ed, and James. Accordingly, the content items 312-316 authored by Bob, Ed, and James are analyzed to determine an interest level associated with the soft post content item 310. More specifically, each of the content items 312-316 can be examined to determine whether the associated user is expected to be interested in the soft post content item 310.

As a first example, the text of the content items 312-316 can be examined to determine if the associated user is expected to be interested in the soft post content item 310. For instance, if any of the content items 312-316 reference in their text a common entity (e.g., a particular name, place, date, time, etc.) with the soft post content item 310, it can be reasonably presumed that the associated user will find the content item 310 meaningful. With reference to the current example, each of the content items 312 ("Starved, headed to Sun Café for breakfast.") and 316 ("So tired . . . coffee and breakfast at Sun Café is my only hope"), authored by Bob and James respectively, includes the word "Sun Café", which is also included in Dave's soft post content item 310. As a result, it can be reasonably presumed that Bob and James will view a post from Dave related to breakfast at Sun Café as a significant post. On the other hand, the content item 314 ("Feeling great. Ready for a great day at work."), authored by Ed, does not include the common entity "Sun Café". Thus, it can be reasonably presumed that Ed would not be interested in Dave's content item 310. Likewise, textual similarity techniques (e.g., Vector Space Modeling and Latent Semantic Analysis) can be used as an appropriate method of content analysis. For example, it can be reasonably presumed that authors of textually similar content items will be interested in a particular soft post content item.

As a second example, tag identifiers associated with the content items 312-316 can be examined to determine whether the associated user is expected to be interested in the content item 310. The tag identifiers can be included in metadata associated with the content items and/or embedded in the text of the content items (e.g., hashtags). In some examples, a content item can include a collection of relevant tag identifiers ("a tag cloud"). In some examples, tag identifiers are assigned to content items automatically, without user input. In some examples, free-form tag identifiers can be generated by authors. If a particular content item includes a common tag identifier with a soft post content item, it can be presumed that the associated user (i.e., the author) of the particular content item would find the soft post content item to be a significant post. With reference to the current example, consider that the content items 312 and 316, authored by Bob and James respectively, are tagged with the identifying term "breakfast", while the content item 314, authored by Ed, is tagged with the identifying term "work". It can be reasonably presumed that Bob and James will find Dave's soft post, which is similarly tagged with the identifying term "breakfast" as a significant post, and that Ed will not necessarily find the post to be significant or interesting.

The examples described above provide suitable techniques for determining expected interest in a soft post content item by users based on their own authored content. However, other suitable techniques for determining expected interest by a user in a soft post content item can also be employed. For instance, in the above-examples, content items authored by Bob, Ed, and/or James were examined to determine expected interest in Dave's soft post content, or a lack thereof. In some examples, content items authored by Bob, Ed and/or James can include content items that were distributed after the soft post was provided by Dave. However, it can also be appropriate to consider previous content items authored by these users. For example, if Ed previously posted a comment referencing "Sun Café" or tagged with the term "breakfast", it could be reasonably presumed that Ed will find Dave's soft post content item to be a significant one.

Further, in some examples, analysis of other social networking activities can be examined to determine expected interest in a soft post content item. For instance, social interaction events (e.g., endorsements, comments, or shares) can be analyzed to determine expected interest. With reference to the example of FIG. 3, consider that Ed interacts with posts by Dave at a particularly high rate (e.g., a rate of fifty percent or greater). In this case, even if the content items authored by Ed are not related to a similar topic as Dave's soft post content item, it can be reasonably presumed that Ed will view a content item authored by Dave as significant. Other sources of information can also be examined for such analysis. For instance, content maintained on a user's profile page can be considered in determining interest in a particular content item. Again, referencing the current example, consider that Ed has indicated an interest in breakfast on his profile page. It can be reasonably presumed that Ed would find Dave's soft post content item about breakfast at Sun Café to be a significant post.

In some examples, the interest level is calculated as an aggregate interest level score, where each user expected to be interested in the soft post content item is attributed a count of one. For instance, in this particular example, it has been determined that users 304 and 308, Bob and James, are expected to be interested in the soft post content item 310, but that Ed is not expected to be interested. Accordingly, in the current example, the aggregate interest level score would be two. In some examples, a contribution to the interest level score by a particular user of the selected group can be weighted. For example, a user having a relatively high affinity with the author of the soft post may be attributed a maximum weight (e.g., 1) that can be applied in determining the aggregate interest level score. On the other hand, a user having a relatively low affinity with the author of the soft post may be attributed a weight of less than the maximum weight in determining the interest level score. In some examples, weights can range between a maximum weight (e.g., 1) and a minimum weight (e.g., 0).

With reference to the current example, consider that Bob has a relatively high affinity to Dave in the social network, and James has a relatively low affinity to Dave. In some examples, a weight associated with Bob's contribution to the interest level can be provided as 1 to provide an interest level score of one, while a weight associated with James' contribution can be provided as 0.5 to provide an interest level score of 0.5. In this example, it can be determined that an interest level score associated with Ed can be 0. Accordingly, and for this example, the aggregate interest level score would be one and one-half (e.g., 1.5).

In some implementations, the interest level can be averaged to range between a minimum value (e.g., 0) and a maximum value (e.g., 1). In some examples, the interest level is calculated as a percentage of the selected group of users. That is, for example, the interest level can be averaged as the ratio of the aggregate interest level score and the number of contacts that contributed to the determination of the aggregate interest level score. In the above example, in which affinity is not considered, the interest level can be provided as 0.66 (e.g., the ratio of 2-to-3). In the above example, in which affinity is considered, the interest level can be provided as 0.50 (e.g., the ratio of 1.5-to-3). As noted above, the interest level can reflect a likelihood that users of the selected group of users would be interested in the viewing the soft post. Consequently, and in the above examples, it can be provided that there are a likelihoods of 66% and 50%, respectively, that the distribution associated with the soft post (e.g., the users Bob, Ed and James) would collectively be interested in the viewing the soft post.

Access to the soft post content item 310 is selectively provided based on a comparison of the calculated interest level and the interest level threshold. That is, access to the soft post item is distributed to users provided in the distribution associated with the soft post, if the calculated interest level exceeds the interest level threshold. For instance, with reference to the current example, an interest level threshold of 0.5 may be assigned to the soft post authored by Dave. In this example, the interest level score of 0.75 exceeds the interest level threshold. Accordingly, Dave's content item 310 is made available to its intended recipients, including Bob, Ed, and James. In some examples, Dave would be provided with a notification indicating that the soft post content item 310 has accumulated enough interest to be distributed to the intended recipients.

If the measured interest level for a particular soft post content item does not meet or exceed the interest level threshold it can be withheld from the recipients defined in the distribution data. For example, the soft post content item can be made invisible on the recipients' content stream or remain in a queue, undelivered to the recipients. In some examples, over a specified period of time (e.g., X minutes, hours, or days, where X is any positive real number), the measured interest level is refreshed or re-calculated at predetermined time intervals. The refreshed interest level for the soft post content item is compared to the interest level threshold and access to the content item by the recipients is carried out as described above. If the interest level of the soft post content item does not meet or exceed the interest level threshold at the expiration of the specified time period, it can be discarded (e.g., deleted from computer memory) or sent back to its author. In some examples, at the expiration of the specified period of time, the author of the soft post is provided with a notification indicating that the content item has not been made accessible to all of the recipients.

Other appropriate schemes for controlling access to a soft post content item can also be utilized. For instance, in some examples, the soft post content item is automatically made accessible to recipient users having a relatively high affinity with the author of the soft post, but withheld from other recipients having a relatively low affinity unless the interest level threshold is satisfied. With reference to the example of FIG. 3, consider that Ed and Bob have a relatively high affinity with Dave, while James has a relatively low affinity with Dave. In this case, Dave's soft post content item can be made immediately available to Ed and Bob (i.e., without consideration of the interest level threshold), and conditionally withheld from James based on the measured interest level. In this scenario, it would be appropriate to either consider or disregard contributions by Ed and Bob to the interest level of the soft post. Further, in some examples, if it is determined that a soft post has not accumulated enough interest for global distribution, it is distributed only to those users who it is presumed will find the soft post content item to be significant.

In some examples, multiple posts (e.g., multiple soft posts or a mix of soft and hard posts) from various related users (e.g., users who are connected to one another in a social network) can be linked or merged, for example, if they include content related to a similar topic. The linked posts can have a combined calculated interest level (e.g., equal to the sum of their individual interest levels) that can be used to control access to the posts, as described above. For example, when the combined interest level surpasses an interest level threshold, the posts, when they "go live" or otherwise become accessible to other users, can be linked together.

Figure 4:
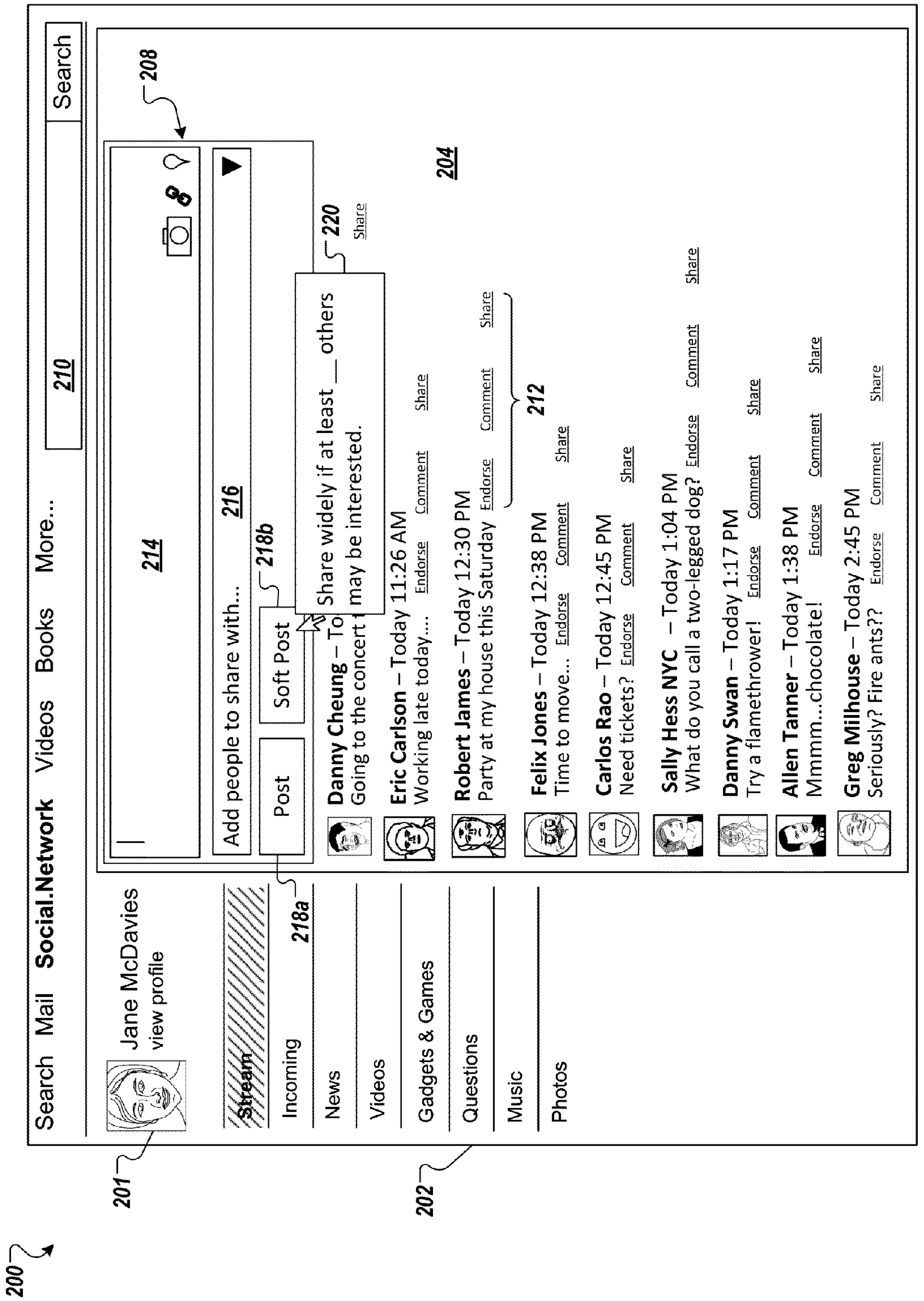
FIG. 4 shows the example main page of FIG. 2 used in implementing a soft posting technique.

FIG. 4 shows the example main page 200 of FIG. 2 used in implementing a soft posting technique. In this example, the user "Jane McDavies" can utilize the content sharing interface 208 to author a soft post content item. The sharing interface 208 includes a content element 214 for generating a content item, a recipient element 216 for defining intended recipients of the content item, and posting buttons 218*a* and 218*b*. In this particular example, selecting posting button 218*a* indicates that the generated content item is to be distributed unconditionally to the intended recipients. On the other hand, selecting posting button 218*b* indicates that the content item is to be conditionally distributed based on an interest level threshold. In response to selecting posting button 218*b*, the user can be presented with an additional element 220 for defining the interest level threshold that is assigned to the soft post.

Figure 5:
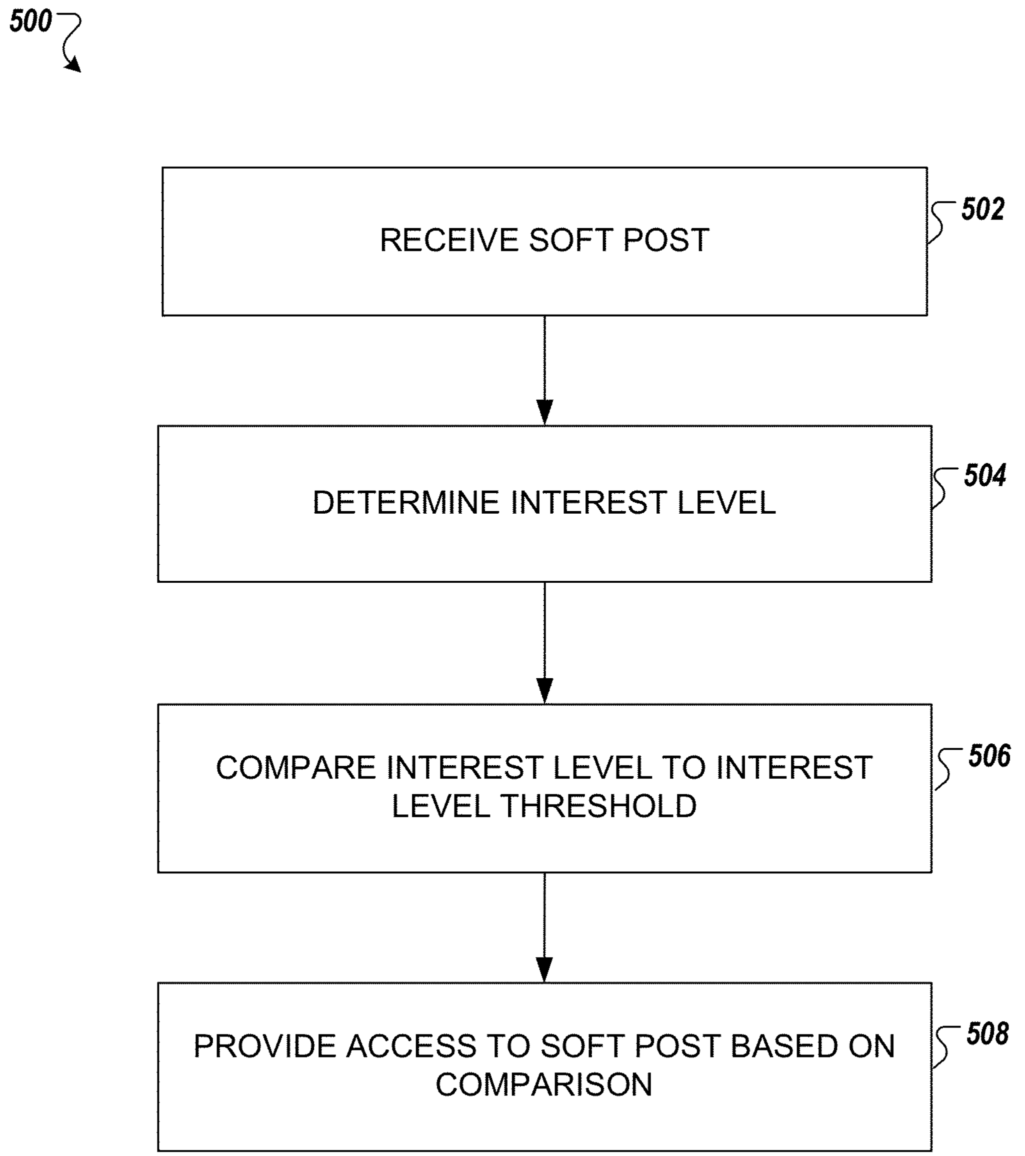
FIG. 5 is a flowchart of an example process that can be executed in implementations of the present disclosure.

FIG. 5 is a flowchart of an example process 500 that can be executed in implementations of the present disclosure. In some implementations, the example process 500 can include operations that are performed using one or more computer programs executed using one or more data processing apparatus (e.g., one or more client-side computing devices and/or one or more server-side computing devices). The example process 500 can be executed to implement soft posting in social networking environments.

A soft post is received (502). For example, a soft post generated by a user associated with a client computing device (e.g., any one of the client devices 102-110 of FIG. 1) can be received by a social networking server (e.g., the server system 112 of FIG. 1). As noted above, the soft post can include a content item, distribution data, and an interest level threshold. An interest level associated with the soft post is determined (504). For example, as described in detail above with reference to FIG. 4, the interest level can be determined by identifying users of a selected group who are expected to find the content item of the soft post to be significant. Any one of several appropriate techniques can be utilize to aggregate an interest level based on the identified users. The interest level is compared to an interest level threshold (506), and access to the soft post content item by the recipients is controlled based on this comparison (508). For example, one of several suitable control schemes includes distributing the soft post content item to all recipients if, and only if, the measured interest level meets or exceeds the interest level threshold.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method executed using one or more processors, the method comprising:

receiving, by the one or more processors, a soft post authored by a user, the soft post comprising multiple data components, the multiple data components comprising an electronic content item and distribution data defining a distribution associated with the electronic content item, the distribution comprising a selected group of users that are socially connected to the user within a computer-implemented social networking service, the soft post being withheld from the distribution until an interest level exceeds an interest level threshold associated with the soft post;

determining, by the one or more processors, the interest level with respect to the electronic content item of the soft post based on electronic content items submitted by one or more users of the selected group of users, the interest level reflecting a likelihood that users of the selected group of users would be interested in the viewing the soft post;

comparing, by the one or more processors, the interest level to the interest level threshold associated with the soft post; and determining, by the one or more processors, that the interest level exceeds the interest level threshold, and in response, automatically providing user access to the electronic content item of the soft post based on the distribution.

2. The method of claim 1, wherein determining an interest level comprises identifying electronic content items submitted by users of the selected group of users that are related to the electronic content item of the soft post.

3. The method of claim 2, wherein identifying electronic content items that are related to the electronic content item of the soft post comprises identifying electronic content items that reference a common entity with the electronic content item of the soft post.

4. The method of claim 2, wherein identifying electronic content items that are related to the electronic content item of the soft post comprises identifying electronic content items that include a common tag identifier with the electronic content item of the soft post.

5. The method of claim 2, wherein identifying electronic content items that are related to the electronic content item of the soft post comprises determining textual similarity between the electronic content items and the electronic content item of the soft post.

6. The method of claim 1, wherein determining an interest level comprises calculating a score based on electronic content items submitted by users of the selected group of users that are related to the electronic content item of the soft post.

7. The method of claim 6, wherein calculating the score comprises determining a quantity of users that have submitted related electronic content items.

8. The method of claim 1, wherein the electronic content items submitted by the users comprise electronic content items submitted by the users prior to receiving the soft post.

9. The method of claim 1, wherein selectively providing access comprises distributing the electronic content item of the soft post to each user in the selected group of users in response to determining that the interest level is greater than or equal to the interest level threshold.

10. The method of claim 1, further comprising transmitting, to the author of the soft post, a notification that the electronic content item of the soft post has been distributed.

11. A non-transitory computer-readable medium coupled to one or more processors having instructions stored thereon which, when executed by the one or more processors, cause the one or more processors to perform operations comprising:

receiving a soft post authored by a user, the soft post comprising multiple data components, the multiple data components comprising an electronic content item and distribution data defining a distribution associated with the electronic content item, the distribution comprising a selected group of users that are socially connected to the user within a computer-implemented social networking service, the soft post being withheld from the distribution until an interest level exceeds an interest level threshold associated with the soft post;

determining the interest level with respect to the electronic content item of the soft post based on electronic content items submitted by one or more users of the selected group of users, the interest level reflecting a likelihood that users of the selected group of users would be interested in the viewing the soft post;

comparing the interest level to the interest level threshold associated with the soft post; and determining that the interest level exceeds the interest level threshold, and in response, automatically providing user access to the content item of the soft post based on the distribution.

12. The computer-readable medium of claim 11, wherein determining an interest level comprises identifying electronic content items submitted by users of the selected group of users that are related to the electronic content item of the soft post.

13. The computer-readable medium of claim 12, wherein identifying electronic content items that are related to the electronic content item of the soft post comprises identifying electronic content items that reference a common entity with the electronic content item of the soft post.

14. The computer-readable medium of claim 12, wherein identifying electronic content items that are related to the electronic content item of the soft post comprises identifying electronic content items that include a common tag identifier with the electronic content item of the soft post.

15. The computer-readable medium of claim 12, wherein identifying electronic content items that are related to the electronic content item of the soft post comprises determining textual similarity between the electronic content items and the electronic content item of the soft post.

16. The computer-readable medium of claim 11, wherein determining an interest level comprises calculating a score based on electronic content items submitted by users of the selected group of users that are related to the electronic content item of the soft post.

17. The computer-readable medium of claim 16, wherein calculating the score comprises determining a quantity of users that have submitted related electronic content items.

18. The computer-readable medium of claim 11, wherein the electronic content items submitted by the users comprise electronic content items submitted by the users prior to receiving the soft post.

19. The computer-readable medium of claim 11, wherein selectively providing access comprises distributing the electronic content item of the soft post to each user in the selected group of users in response to determining that the interest level is greater than or equal to the interest level threshold.

20. The computer-readable medium of claim 11, wherein operations further comprise transmitting, to the author of the soft post, a notification that the electronic content item of the soft post has been distributed.

21. A system comprising:

a computing device; and a computer-readable medium coupled to the computing device and having instructions stored thereon which, when executed by the computing device, cause the computing device to perform operations comprising:

receiving a soft post authored by a user, the soft post comprising multiple data components, the multiple data components comprising an electronic content item and distribution data defining a distribution associated with the electronic content item, the distribution comprising a selected group of users that are socially connected to the user within a computer-implemented social networking service, the soft post being withheld from the distribution until an interest level exceeds an interest level threshold associated with the soft post;

determining the interest level with respect to the electronic content item of the soft post based on electronic content items submitted by one or more users of the selected group of users, the interest level reflecting a likelihood that users of the selected group of users would be interested in the viewing the soft post;

comparing the interest level to the interest level threshold associated with the soft post; and determining that the interest level exceeds the interest level threshold, and in response, automatically providing user access to the content item of the soft post based on the distribution.

22. The system of claim 21, wherein determining an interest level comprises identifying electronic content items submitted by users of the selected group of users that are related to the electronic content item of the soft post.

23. The system of claim 22, wherein identifying electronic content items that are related to the electronic content item of the soft post comprises identifying electronic content items that reference a common entity with the electronic content item of the soft post.

24. The system of claim 22, wherein identifying electronic content items that are related to the electronic content item of the soft post comprises identifying electronic content items that include a common tag identifier with the electronic content item of the soft post.

25. The system of claim 22, wherein identifying electronic content items that are related to the electronic content item of the soft post comprises determining textual similarity between the electronic content items and the electronic content item of the soft post.

26. The system of claim 21, wherein determining an interest level comprises calculating a score based on electronic content items submitted by users of the selected group of users that are related to the electronic content item of the soft post.

27. The system of claim 26, wherein calculating the score comprises determining a quantity of users that have submitted related electronic content items.

28. The system of claim 21, wherein the electronic content items submitted by the users comprise electronic content items submitted by the users prior to receiving the soft post.

29. The system of claim 21, wherein selectively providing access comprises distributing the electronic content item of the soft post to each user in the selected group of users in response to determining that the interest level is greater than or equal to the interest level threshold.

30. The system of claim 21, wherein operations further comprise transmitting, to the author of the soft post, a notification that the electronic content item of the soft post has been distributed.

* * * * *